United States Patent
Lou et al.

(10) Patent No.: US 12,448,943 B2
(45) Date of Patent: Oct. 21, 2025

(54) TWO-BODY FLEXIBLE TETHER-CONNECTED OSCILLATING WATER COLUMN

(71) Applicant: E-Wave Technologies LLC, Poughkeepsie, NY (US)

(72) Inventors: Junhui Lou, Albany, OR (US); Adam Bennett, Hoboken, NJ (US)

(73) Assignee: E-Wave Technologies LLC, Poughkeepsie, NY (US)

( * ) Notice: Subject to any disclaimer, the term of this patent is extended or adjusted under 35 U.S.C. 154(b) by 0 days.

(21) Appl. No.: 18/804,332

(22) Filed: Aug. 14, 2024

(65) Prior Publication Data
US 2025/0059942 A1  Feb. 20, 2025

Related U.S. Application Data

(60) Provisional application No. 63/519,295, filed on Aug. 14, 2023.

(51) Int. Cl.
 *F03B 13/14* (2006.01)
 *F03B 13/24* (2006.01)

(52) U.S. Cl.
 CPC ........... *F03B 13/142* (2013.01); *F03B 13/24* (2013.01); *F05B 2210/18* (2013.01); *F05B 2250/232* (2013.01)

(58) Field of Classification Search
 CPC ........ F03B 13/142; F03B 13/24; F03B 13/20; F05B 2210/18; F05B 2250/232; F05B 2210/404; Y02E 10/30
 USPC ...................................................... 290/42, 53
 See application file for complete search history.

(56) References Cited

U.S. PATENT DOCUMENTS

| | | | |
|---|---|---|---|
| 10,393,089 B2 | 8/2019 | Mundon et al. | |
| 11,542,913 B1 | 1/2023 | Hammagren et al. | |
| 2004/0061338 A1* | 4/2004 | Woodbridge | F03B 13/1845 290/53 |
| 2007/0286683 A1* | 12/2007 | Bull | B63B 35/4406 60/497 |
| 2008/0131208 A1* | 6/2008 | Bull | B63B 35/4406 405/23 |
| 2016/0003214 A1 | 1/2016 | Mundon et al. | |

(Continued)

FOREIGN PATENT DOCUMENTS

| | | |
|---|---|---|
| GB | 2594095 A | 10/2021 |
| WO | 2019139007 A1 | 7/2019 |

OTHER PUBLICATIONS

Mundon, "Triton-C Point Absorber Preliminary System Design Package", No. 244. Marine and Hydrokinetic Data Repository (MHKDR); Oscilla Power, Inc., 2017, 22 pages.

(Continued)

*Primary Examiner* — Charles Reid, Jr.
(74) *Attorney, Agent, or Firm* — Cesari and McKenna, LLP

(57) ABSTRACT

An oscillating water column (OWC) includes a top body and a bottom body. The top body includes a hollow shape, an open top end, an open bottom end, a chamber traversing between the open top and bottom ends, a power take-off system proximate to the open top end, and an air channel proximate to the open top end and the power take-off system. The bottom body includes a bottom heave plate and a plurality of flexible tethers coupling the top body and the bottom body.

14 Claims, 13 Drawing Sheets

(56) References Cited

U.S. PATENT DOCUMENTS

| | | | |
|---|---|---|---|
| 2017/0363058 A1 | 12/2017 | Etherington | |
| 2019/0010915 A1* | 1/2019 | MacDonald | ............ F03B 13/20 |
| 2019/0353139 A1 | 11/2019 | Sheldon-Coulson et al. | |
| 2022/0047993 A1 | 2/2022 | Mundon et al. | |

OTHER PUBLICATIONS

Dean et al., "Water Wave Mechanics for Engineers and Scientists—Advanced Series on Ocean Engineering, vol. 2.", World Scientific Publishing Company, Sec. 4.2, pp. 79-89, 1991.

Rinaldi et al., "Multivariate analysis of the reliability, availability, and maintainability characterizations of a Spar-Buoy wave energy converter farm", Journal of Ocean Engineering and Marine Energy, vol. 4 (2018): 199-215.

Portillo et al., "Wave energy converter physical model design and testing: The case of floating oscillating-water-columns", Applied Energy, vol. 278 (2020): 115638, 15 pages.

Harris et al., "Development of a hybrid simulation for an ocean wave energy converter", 2021 IEEE Power & Energy Society General Meeting (PESGM). IEEE, 2021, 5 pages.

Henriques et al., "Design of oscillating-water-column wave energy converters with an application to self-powered sensor buoys", Energy, vol. 112 (2016): 852-867.

Ulm et al., "Experimental Study of a Fixed OWC-Type Wave Energy Converter with a Heave Plate and V-Shaped Channels for Intermediate-Water-Depth Applications", Energies vol. 16, (2023): 5988, 30 pages.

Deng et al. "Hydrodynamic performance of a novel oscillating-water-column breakwater with a horizontal bottom-plate: Experimental and numerical study", Ocean Engineering, vol. 187 (2019): 106174, 15 pages.

Deng et al., "Hydrodynamic Performance of an Offshore-Stationary OWC Device with a Horizontal Bottom Plate: Experimental and Numerical Study", Energy, No. 187, 2019, 17 pages.

International Searching Authority—International Search Report, pertaining to International Application No. PCT/CUS2024/042210 dated Nov. 11, 2024, together with the Written Opinion of the International Searching Authority, 12 pages.

Gomes et al. "Hydrodynamic Optimization of an Axisymmetric Floating Oscillating Water Column for Wave Energy Conversion", Renewable Energy, vol. 44, pp. 328-339, 2012.

* cited by examiner

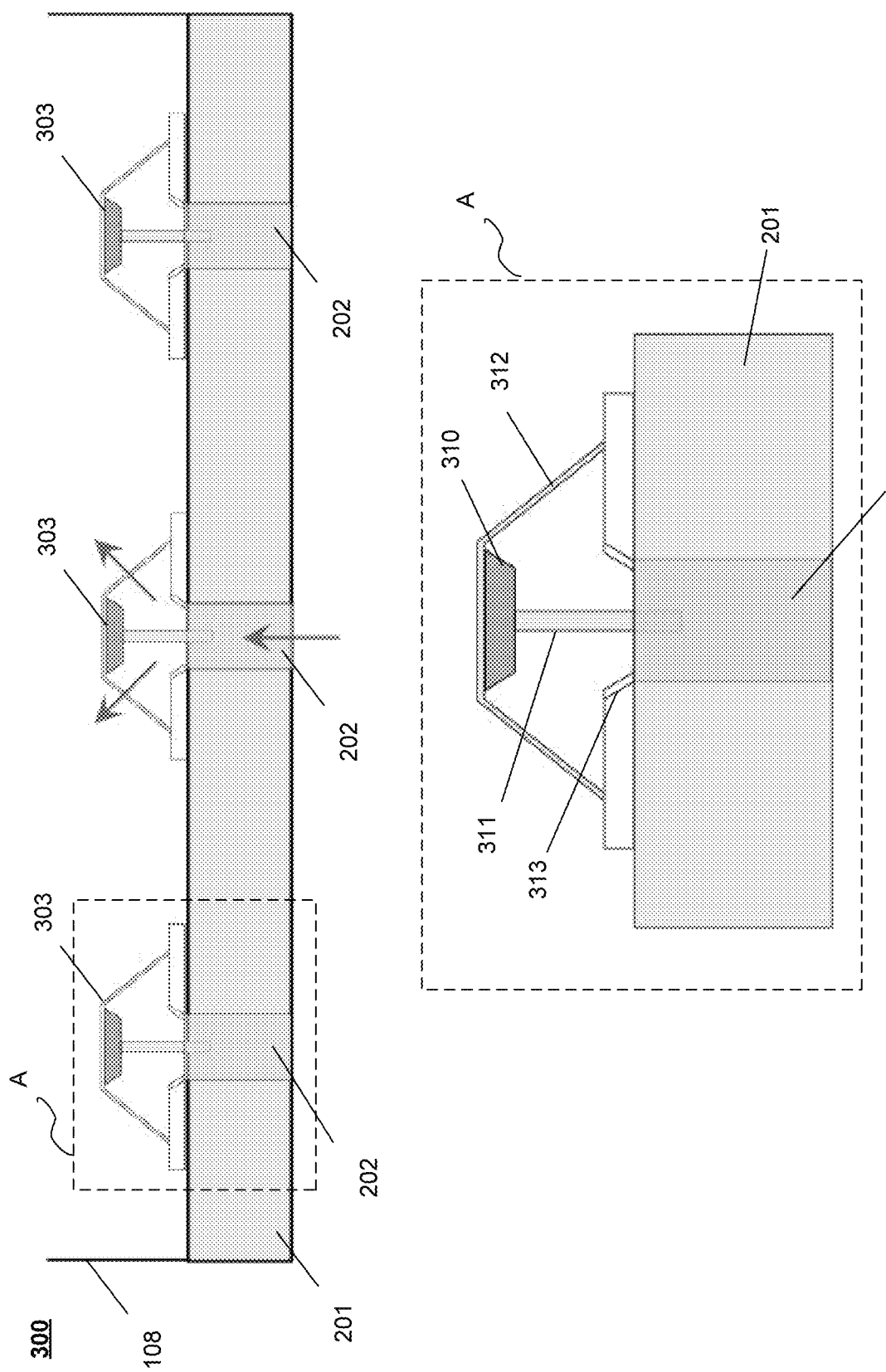

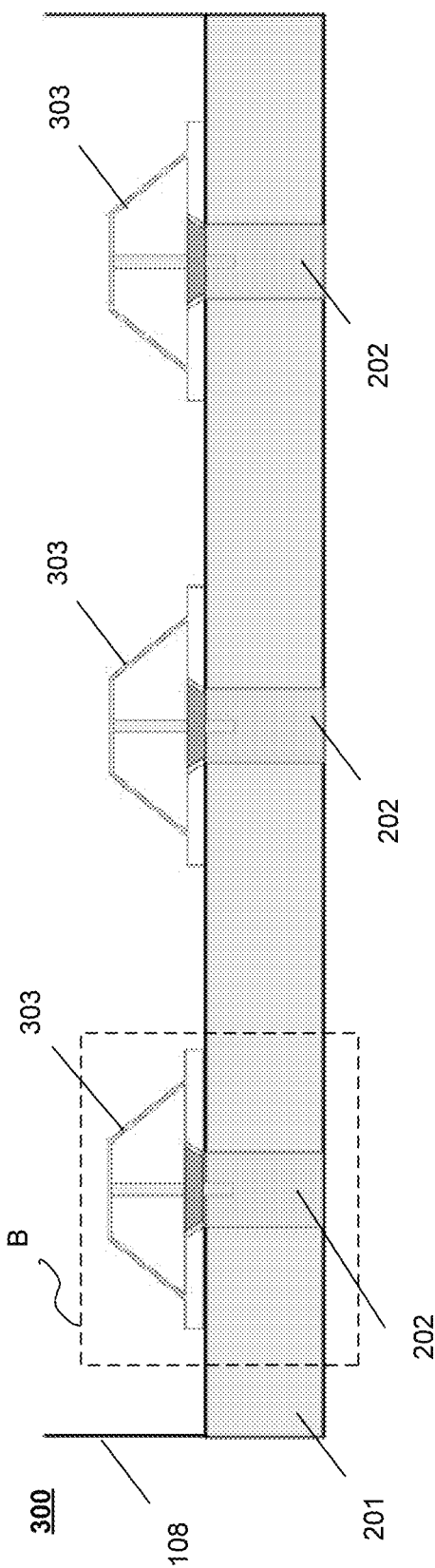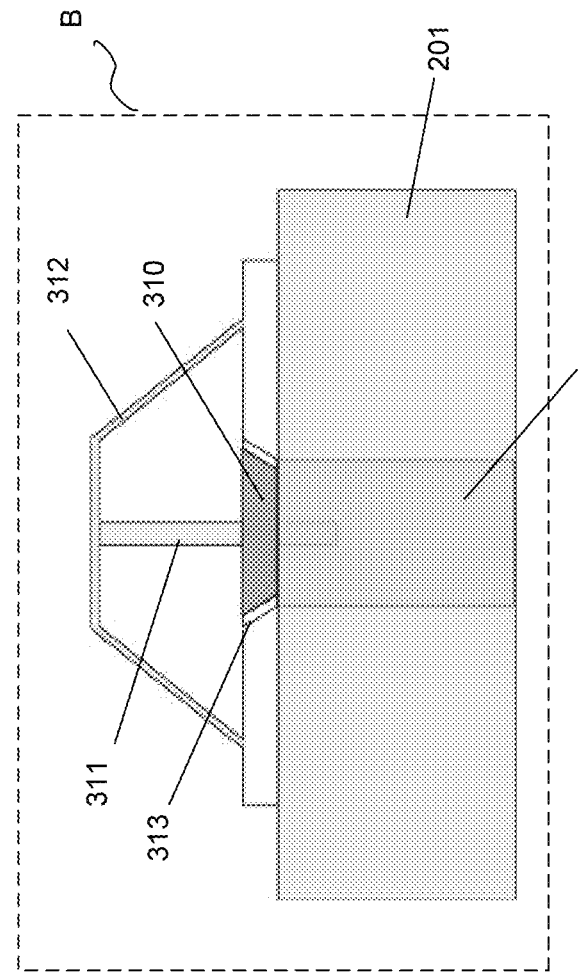
Fig. 3B

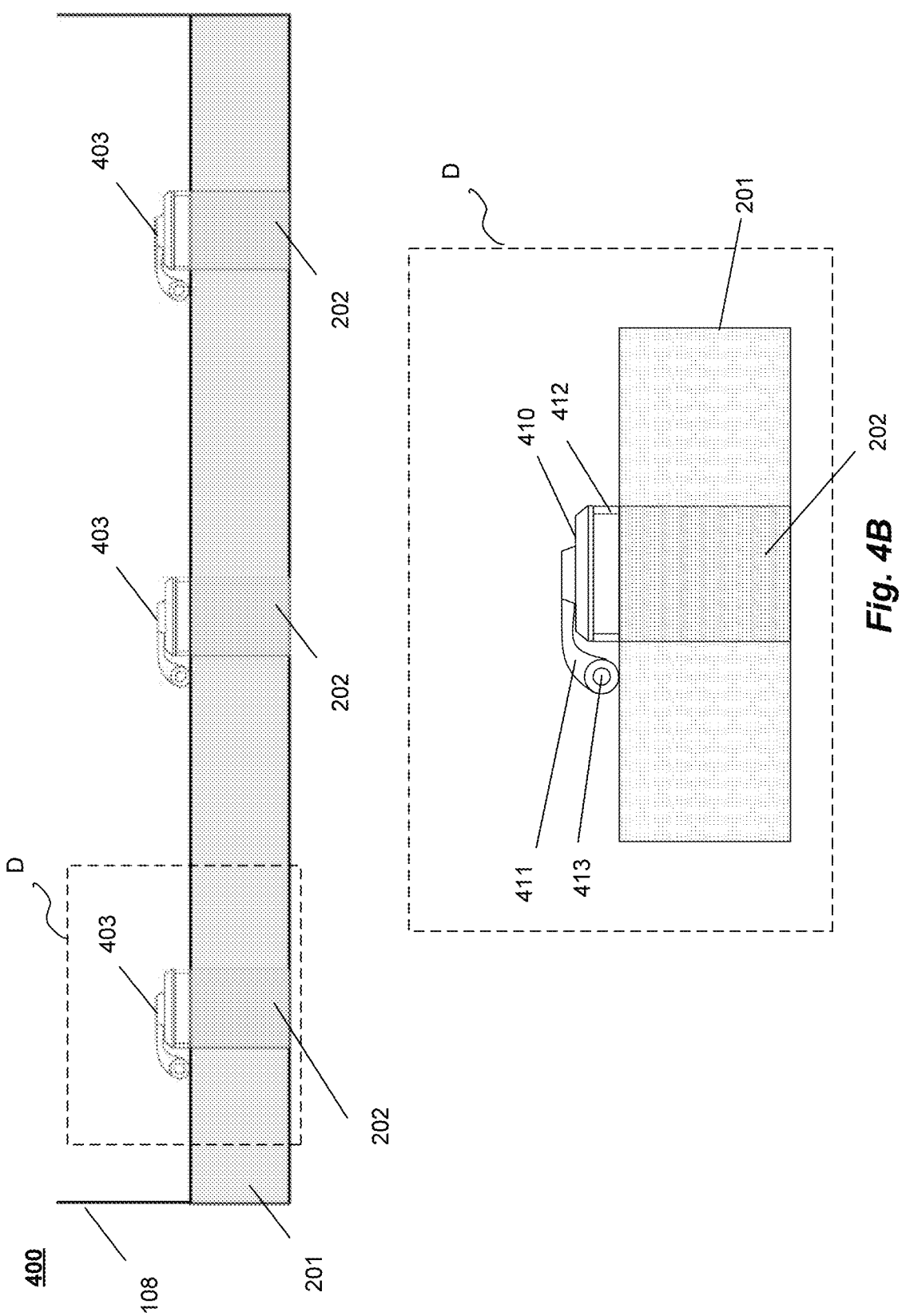

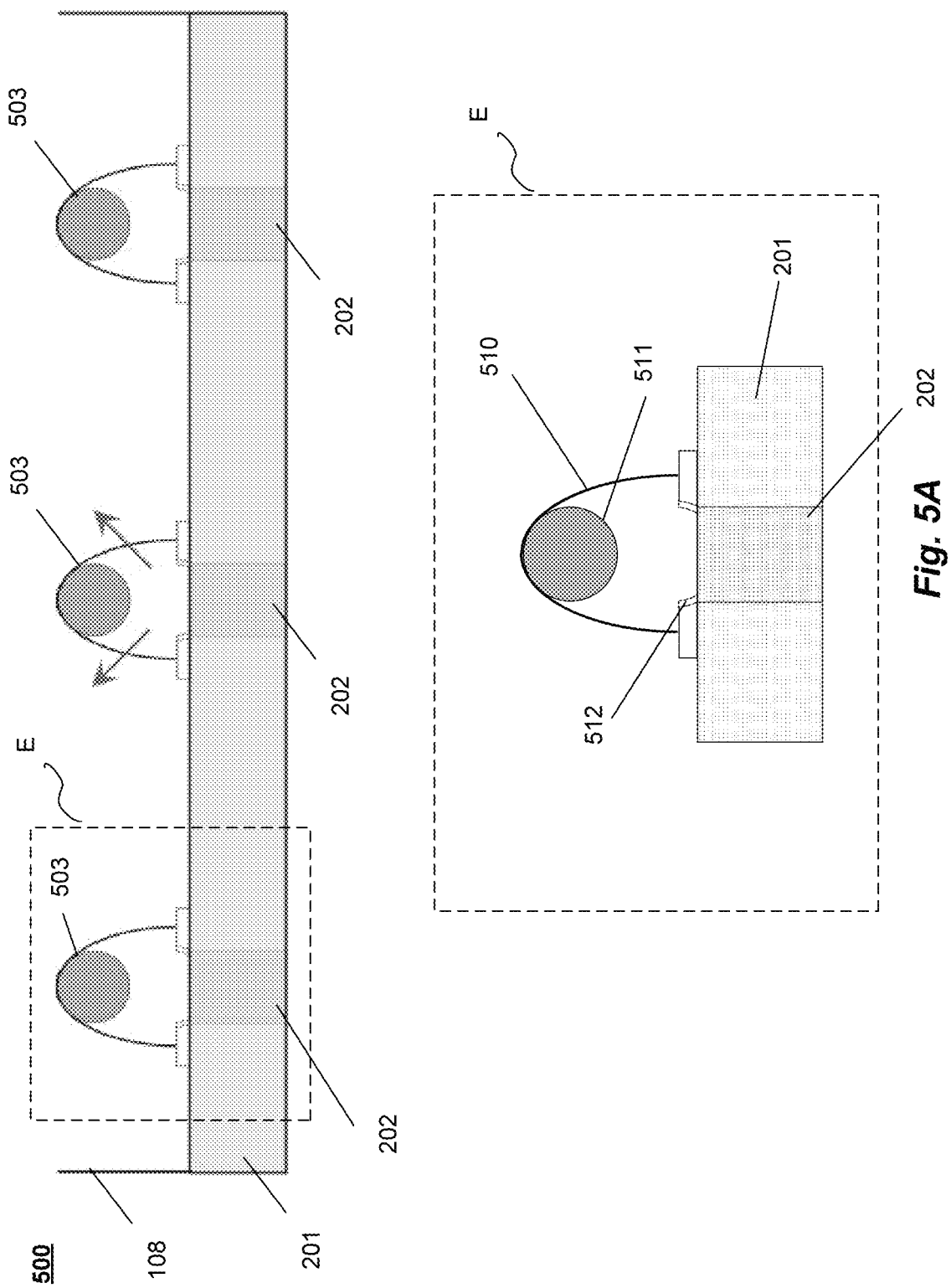

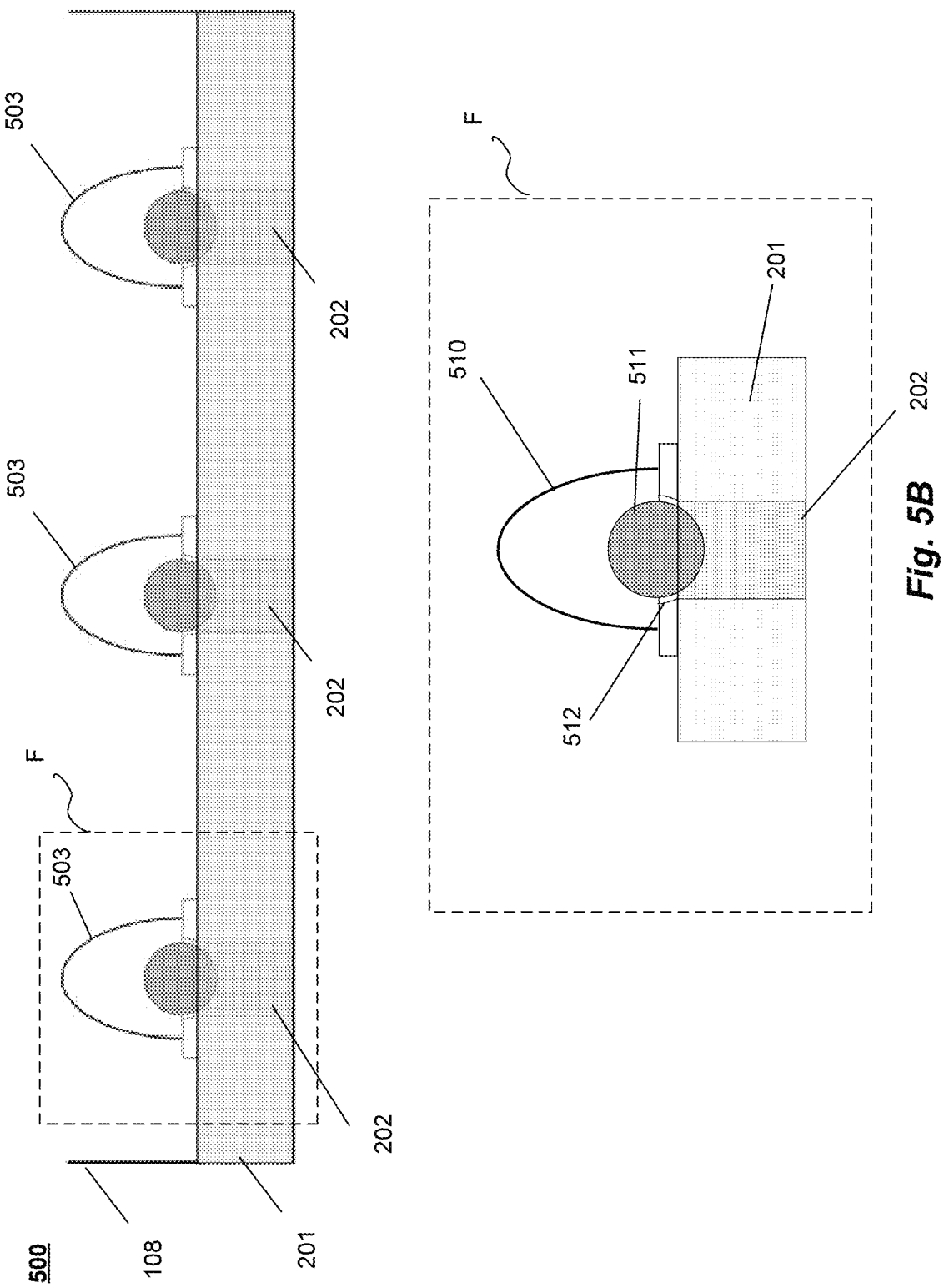

TWO-BODY FLEXIBLE TETHER-CONNECTED OSCILLATING WATER COLUMN

CROSS-REFERENCE TO RELATED APPLICATIONS

The present application claims priority to U.S. Provisional Patent Application Ser. No. 63/519,295 titled "Integrated Design of Floating Oscillating Water Column and Autonomous Feed Buoy for Offshore Aquaculture", filed on Aug. 14, 2023. The foregoing application is incorporated herein by reference in its entirety.

TECHNICAL FIELD

The present invention relates to wave energy converters, and more particularly to oscillating water column type wave energy converters.

BACKGROUND ART

Oscillating water columns (OWCs) are a type of wave energy converter that harness energy from the oscillation of seawater inside a chamber or hallow caused by the action of waves. OWCs are devices with a semi-submerged chamber or hollow open to the sea below, keeping a trapped air pocket above a water column. Waves force the air column to move up and down, forcing air out of the chamber and back into it, creating a bidirectional stream of air. The air is channeled through a power take-off (PTO) system, which converts the airflow into electricity. Various OWC designs exist, with varying degrees of energy conversion efficiency and costs.

SUMMARY OF THE EMBODIMENTS

Disclosed herein are embodiments of an oscillating water column as specified in the independent claims. Embodiments of the present invention are given in the dependent claims. Embodiments of the present invention can be freely combined with each other if they are not mutually exclusive.

In accordance with one embodiment, an oscillating water column (OWC) includes a top body and a bottom body. The top body includes a hollow shape, an open top end, an open bottom end, a chamber traversing between the open top end and the open bottom end, a power take-off system proximate to the open top end, and an air channel proximate to the open top end and the power take-off system. The bottom body includes a bottom heave plate and a plurality of flexible tethers coupling the top body and the bottom body.

In accordance with another embodiment, an oscillating water column (OWC) includes a top body and a bottom body. The top body includes a hollow shape, an open top end, an open bottom end, a chamber traversing between the open top end and the open bottom end, a power take-off system proximate to the open top end, and an air channel proximate to the open top end and the power take-off system. The bottom body includes a bottom heave plate, a plurality of openings in the bottom heave plate, a plurality of valves proximate to the plurality of openings, and a plurality of flexible tethers coupling the top body and the bottom body. The plurality of valves moves to a closed position with an upward motion of the bottom body to close the plurality of openings. The plurality of valves moves to an open position with a downward motion of the bottom body to open the plurality of openings.

In accordance with another embodiment, an oscillating water column (OWC) includes a top body and a bottom body. The top body includes a hollow shape, an open top end, an open bottom end, a chamber traversing between the open top end and the open bottom end, a power take-off system proximate to the open top end, and an air channel proximate to the open top end and the power take-off system. The bottom body includes a bottom heave plate having a geometry with asymmetric effect and a plurality of flexible tethers coupling the top body and the bottom body.

BRIEF DESCRIPTION OF THE DRAWINGS

The foregoing features of embodiments will be more readily understood by reference to the following detailed description, taken with reference to the accompanying drawings, in which:

FIGS. 3A and 3B illustrate cross-sectional views of another embodiment of a bottom body, where the plurality of valves comprises a plurality of lift check valves.

FIGS. 4A and 4B illustrate cross-sectional views of another embodiment of a bottom body, where the plurality of values comprises a plurality of swing check valves.

FIGS. 5A and 5B illustrate cross-sectional views of another embodiment of a bottom body, where the plurality of valves comprises a plurality of ball check valves.

DETAILED DESCRIPTION OF SPECIFIC EMBODIMENTS

The present invention provides a two-body tether-connected oscillating water column with a bottom body configured to change geometry or have a geometry with an asymmetric effect. The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
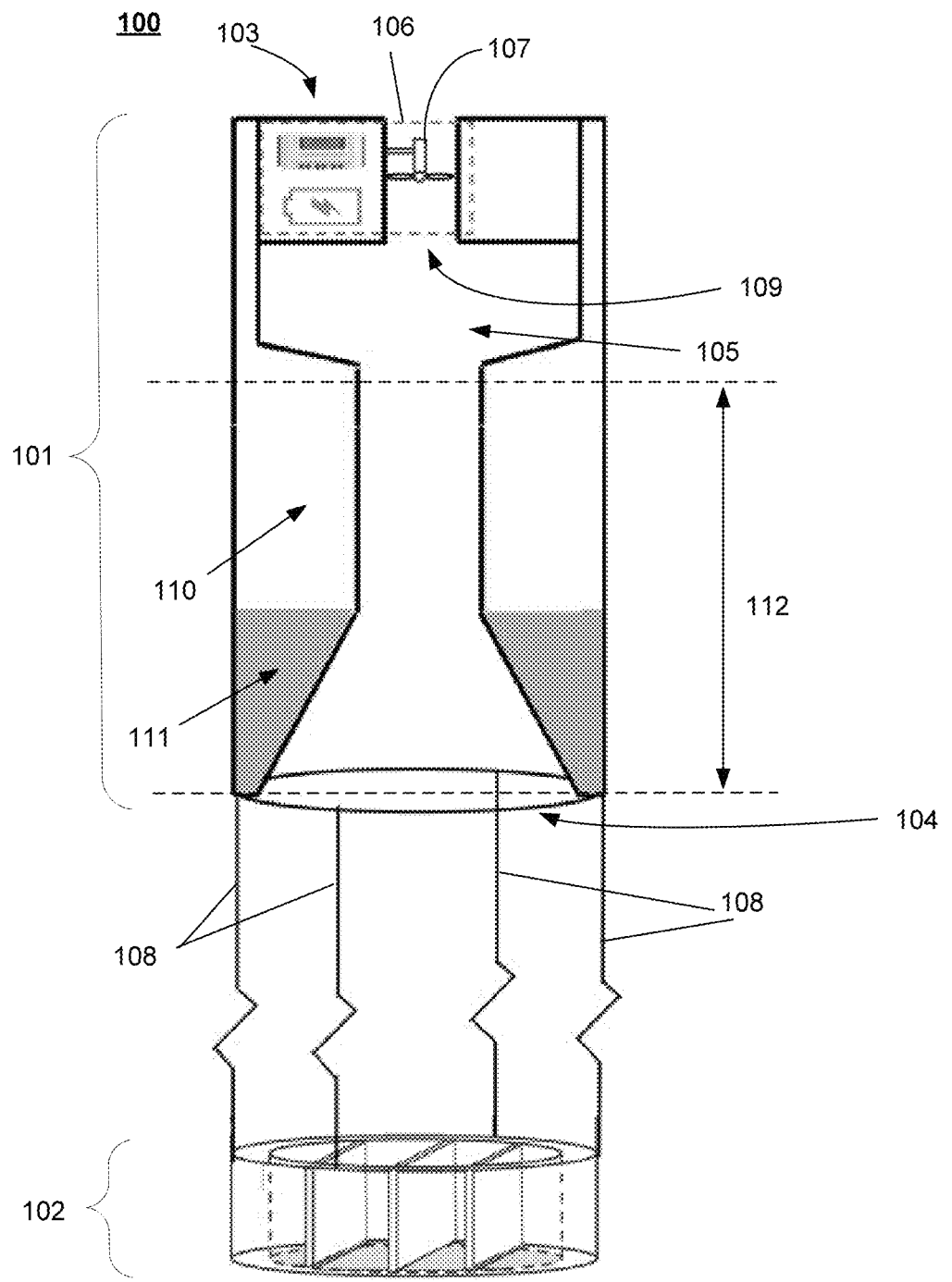
FIG. 1 illustrates a cross-sectional view of a two-body tether-connected oscillating water column (OWC) according to an embodiment.
Figure 8:
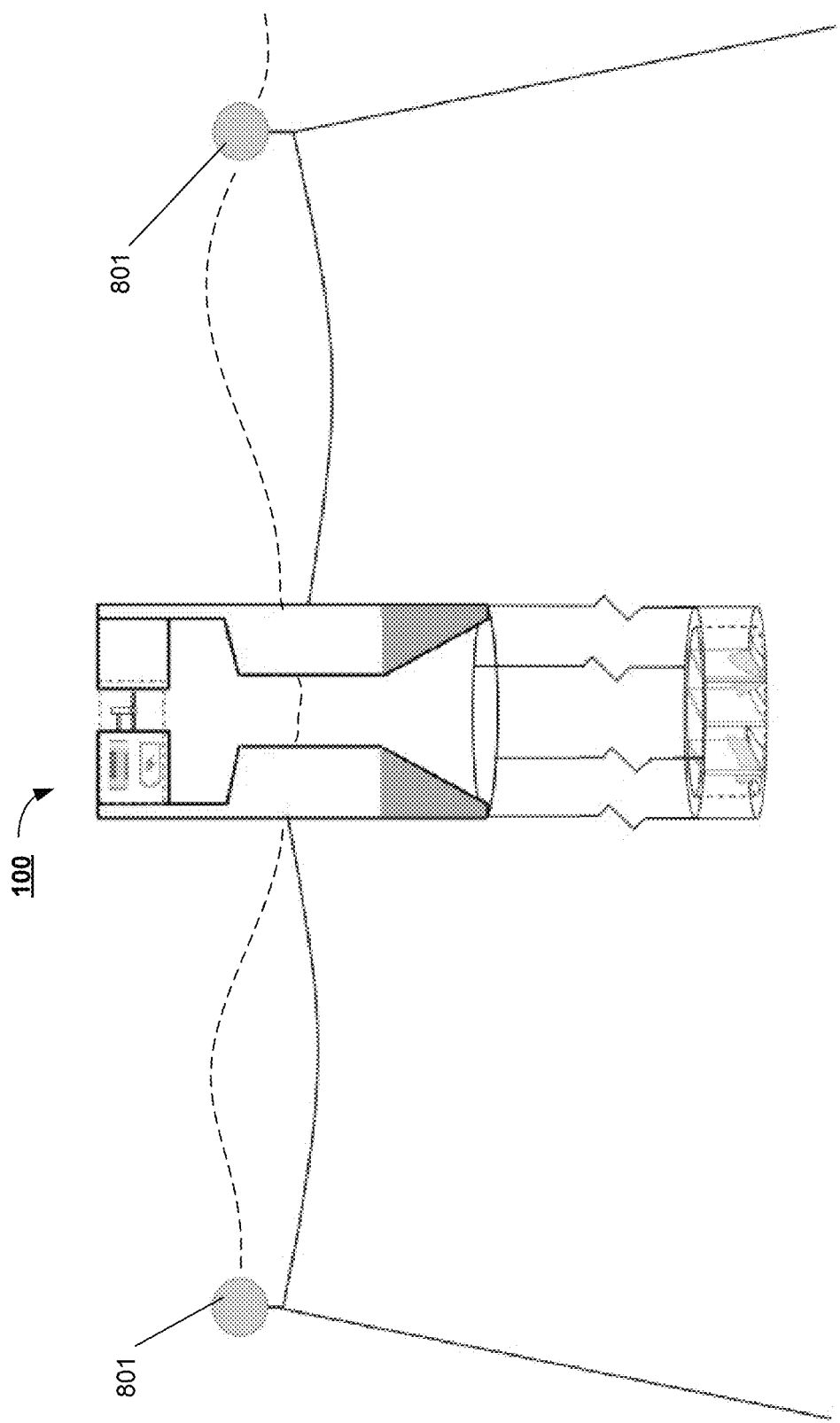
FIG. 8 illustrates a cross-sectional view of an example mooring system for the OWC of FIG. 1.

FIG. 1 illustrates a cross-sectional view of a two-body tether-connected oscillating water column (OWC) according to an embodiment. The two-body tether-connect OWC 100 includes a top body 101 and a bottom body 102. The top body 101 has a buoy column structure, which includes a hollow shape with an open top end 103, an open bottom end 104, and a chamber 105 traversing between the top end 103 and the bottom end 104. Residing proximate to the top end 103 is a power take-off (PTO) system 106 that includes energy storage (e.g., one or more batteries) and a bidirectional air turbine 107 that includes a generator (not shown). Residing below the bidirectional air turbine 107 is an air channel 109 that is narrower than the remainder of the chamber 105, through which air may traverse through the bidirectional air turbine 107. Air traversing through the air turbine 107 causes the air turbine 107 to rotate in the same direction regardless of the direction of air flow. This in turn causes a rotor in the generator to spin, producing electricity, which is stored in the energy storage. For example, a Wells turbine or a self-rectifying impulse turbine may be used. The bottom body 102 may include a cylindrical shape and is coupled to the top body 101 using a plurality of flexible tethers 108, as described further with reference to FIGS. 2A and 2B. The plurality of flexible tethers 108 may be composed of any material that can be configured into a flexible line, such as rope or steel chains, which is not rigid or is capable of being bent or flexed. Other shapes for the bottom body 102 may also be used. As illustrated in FIG. 8, the OWC 100 may be used with different typologies of mooring systems. For example, a spread or single point mooring 801, with catenary or taut configurations, and with or without buoys may be used. Buoys may be incorporated to keep the mooring line horizontal to limit the mooring influences on OWC heave motion.

Figure 2A:
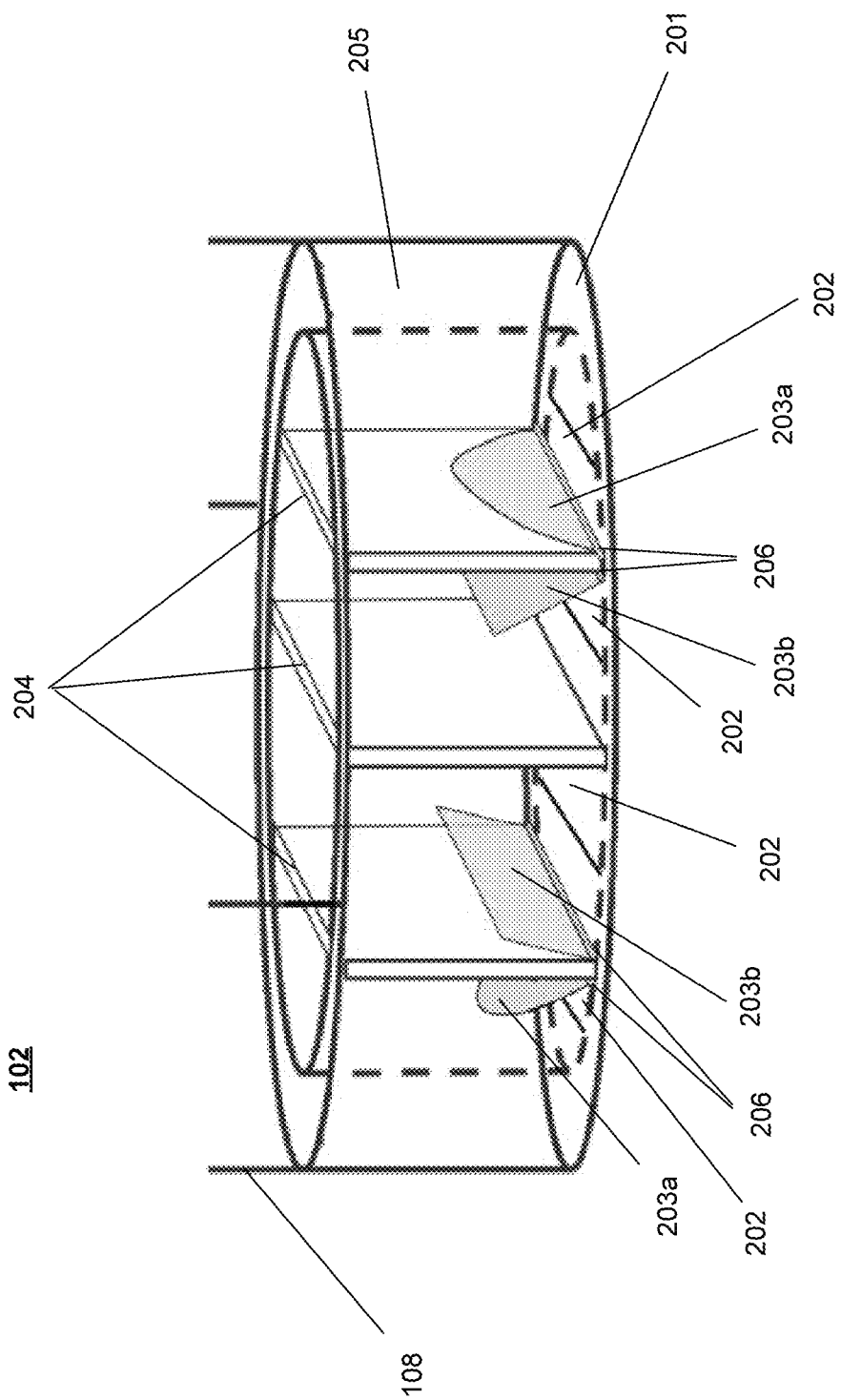
FIGS. 2A and 2B illustrate close-up views of an embodiment of the bottom body of the OWC, where the plurality of valves comprises a plurality of flaps.
Figure 2B:
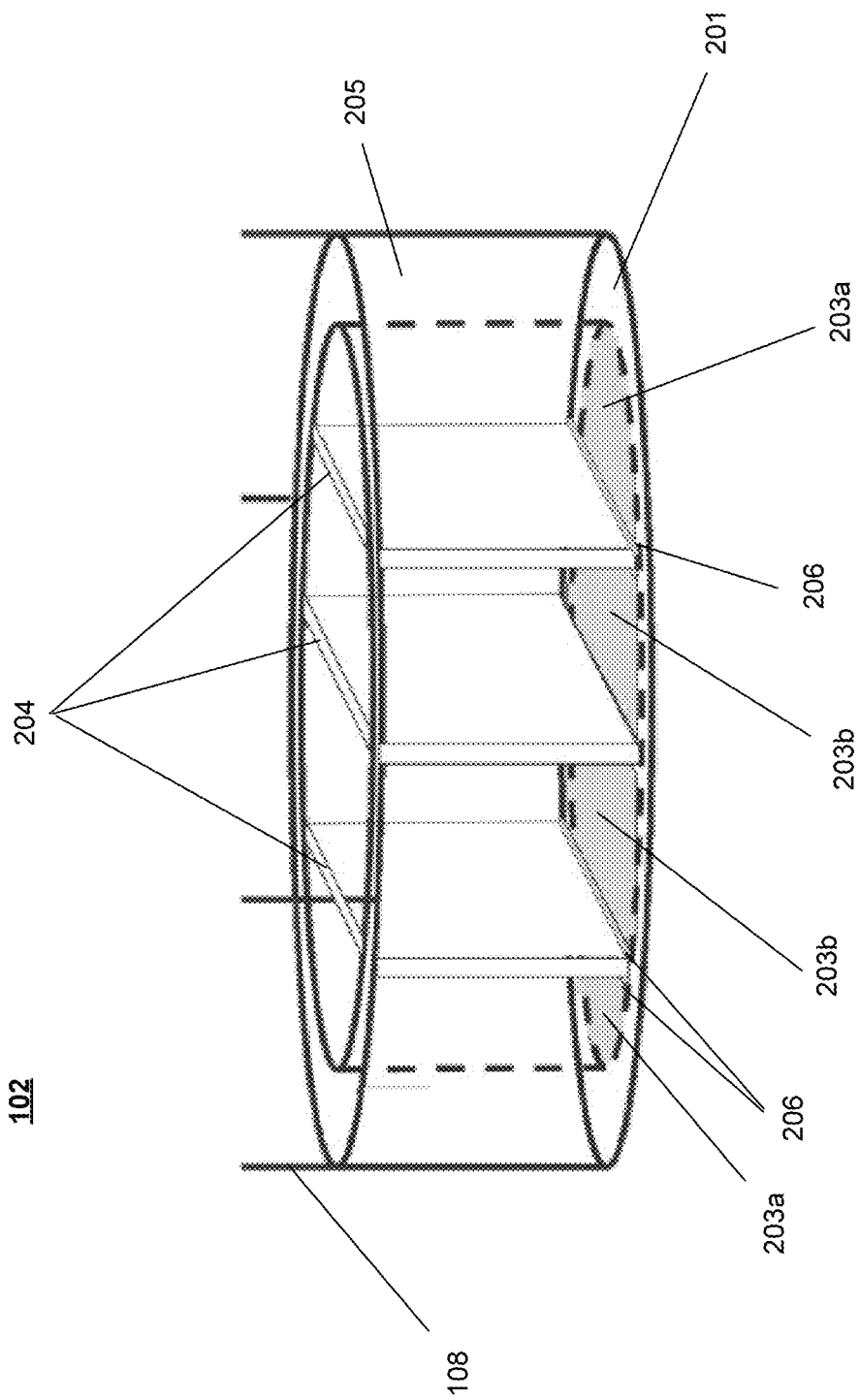

FIGS. 2A and 2B illustrate close-up views of an embodiment of the bottom body 102, where the plurality of valves comprises a plurality of flaps 203a-203b. The bottom body 102 includes a side wall 205 and a bottom heave plate 201 with a plurality of openings 202. Coupled to the bottom heave plate 201 are a plurality of valves. The plurality of valves may comprise a plurality of flaps 203a-203b positioned proximate to the openings 202 and function to passively open and close the openings 202. The bottom body 102 further includes a plurality of vertical plates 204, positioned proximate to the plurality of flaps 203a-203b. The flaps 203a-203b open during a downward motion of the bottom body 102 (see FIG. 2A) and close during an upward motion of the bottom body 102 (see FIG. 2B). The shape of the flaps 203a-203b are such that they contact the bottom heave plate 201 when fully in the closed position, and contact the vertical plates 204 when fully in the open position. The plurality of flaps 203a-203b may rotate open or closed around a plurality of hinges 206. The opening and closing of the flaps 203a-203b are realized passively with the changing hydraulic pressure from the downward and upward motions of the bottom body 102. In an example embodiment, the openings 202 are configured in pairs with a vertical plate 204 positioned between each pair of openings 202. Corresponding to each pair of openings 202 is a pair of flaps 203a-203b, where one flap 203a of the pair has a different shape than the other flap 203b of the pair. In other words, the pair of flaps 203a-203b is asymmetrically shaped. The asymmetric shapes of the flaps 203a-203b increase the coverage of the openings 202 when the flaps 203a-203b are in the closed position.

FIGS. 3A and 3B illustrate cross-sectional views of another embodiment of a bottom body 300, where the plurality of valves comprises a plurality of lift check valves 303. The bottom body 300 is coupled to the top body 101 using the tethers 108. The bottom body 300 includes the bottom heave plate 201 that includes the plurality of openings 202, through which water may flow. Each lift check valve 303 corresponds to one of the openings 202. The lift check valve 303 includes a disk 310 coupled to a shaft 311. The lift check valve 303 further includes a support structure 312 coupled to a seat 313. FIG. 3A illustrates the plurality of lift check valves 303 in an open position, with a close-up view of the lift check valve 303 in section A. During a downward motion of the bottom body 300, the disk 310 of the lift check valve 303 floats, allowing water to flow through the opening 202. In the open position, the disk 310 contacts the support structure 312. FIG. 3B illustrates the plurality of lift check valves 303 in a closed position, with a close-up view of the lift check valve 303 in section B. During an upward motion of the bottom body 300, the disk 310 moves downward until the disk 310 contacts the seat 313. The shape of the seat 313 corresponds to the shape of the bottom of the disk 310, such that when fully engaged with the seat 313, the disk 310 closes the opening 202 to prevent water from flowing through. Similar to the flaps 203a-203b, the opening and closing of the lift check valves 303 are realized passively with the changing hydraulic pressure from the downward and upward motions of the bottom body 300.

Figure 4A:
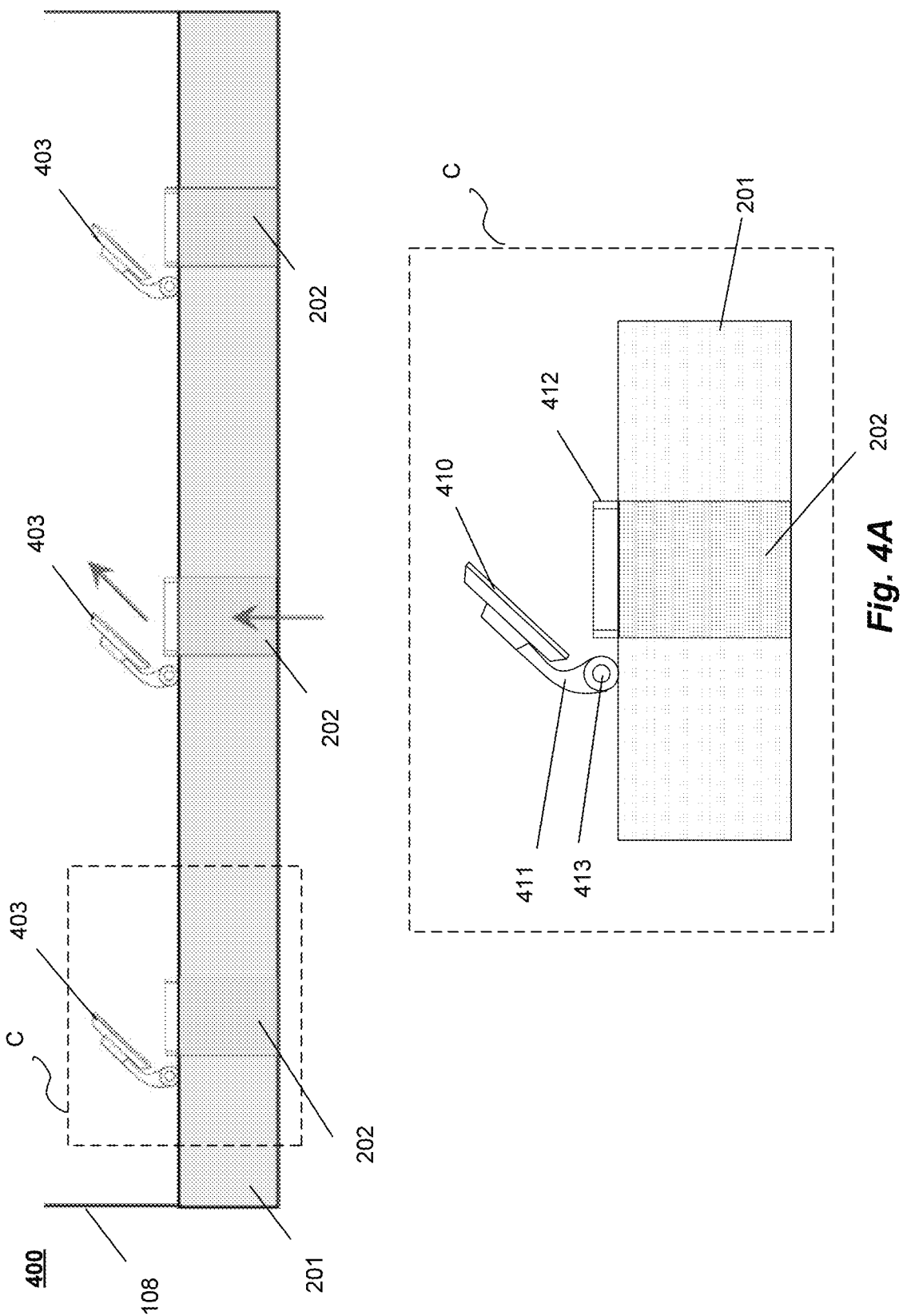

FIGS. 4A and 4B illustrate cross-sectional views of another embodiment of a bottom body 400, where the plurality of valves comprises a plurality of swing check valves 403. The bottom body 400 may be coupled to the top body 101 using the tethers 108. The bottom body 400 includes the bottom heave plate 201 that includes the plurality of openings 202, through which water may flow. Each swing check valve 403 corresponds to one of the openings 202. The swing check valve 403 includes a disk 410 coupled to a hinge 411 configured to rotate about a hinge pin 413. The swing check valve 403 further includes a seat 412. FIG. 4A illustrates the plurality of swing check valves 403 in an open position, with a close-up view of the swing check valve 403 in section C. During a downward motion of the bottom body 400, hinge 411 rotates upward (counterclockwise) about the hinge pin 413, lifting the disk 410 to allow water to flow through the opening 202. FIG. 4B illustrates the plurality of swing check valves 403 in a closed position, with a close-up view of the swing check valve 403 in section D. During an upward motion of the bottom body 400, the hinge 411 rotates downward (clockwise) about the hinge pin 413, until the disk 410 contacts the seat 412. The shape of the seat 412 corresponds to the shape of the bottom of the disk 410, such that when fully engaged with the seat 412, the disk 410 closes the opening 202 to prevent water from flowing through. Similar to the flaps 203a-203b, the opening and closing of the swing check valves 403 are realized passively with the changing hydraulic pressure from the downward and upward motions of the bottom body 400.

FIGS. 5A and 5B illustrate cross-sectional views of another embodiment of a bottom body 500, where the plurality of valves comprises a plurality of ball check valves 503. The bottom body 500 may be coupled to the top body 101 using the tethers 108. The bottom body 500 includes the bottom heave plate 201 that includes the plurality of openings 202, through which water may flow. Each ball check valve 503 corresponds to one of the openings 202. The ball check valve 503 includes a ball 511 coupled to a wire structure 510. The ball check valve 503 further includes a seat 512. FIG. 5A illustrates the plurality of ball check valves 503 in an open position, with a close-up view of the ball check valve 503 in section E. During a downward motion of the bottom body 500, the ball 511 of the ball check valve 503 floats, allowing water to flow through the opening 202. In the open position, the ball 511 contacts the top of the wire structure 510. FIG. 5B illustrates the plurality of ball check valves 503 in a closed position, with a close-up view of the ball check valve 503 in section F. During an upward motion of the bottom body 500, the ball 511 moves downward until the ball 511 contacts the seat 512. The shape of the seat 512 corresponds to the shape of the ball 511, such that when fully engaged with the seat 512, the ball 511 closes the opening 202 to prevent water from flowing through. Similar to the flaps 203a-203b, the opening and closing of the ball check valves 503 are realized passively with the changing hydraulic pressure from the downward and upward motions of the bottom body 500.

Figure 6:
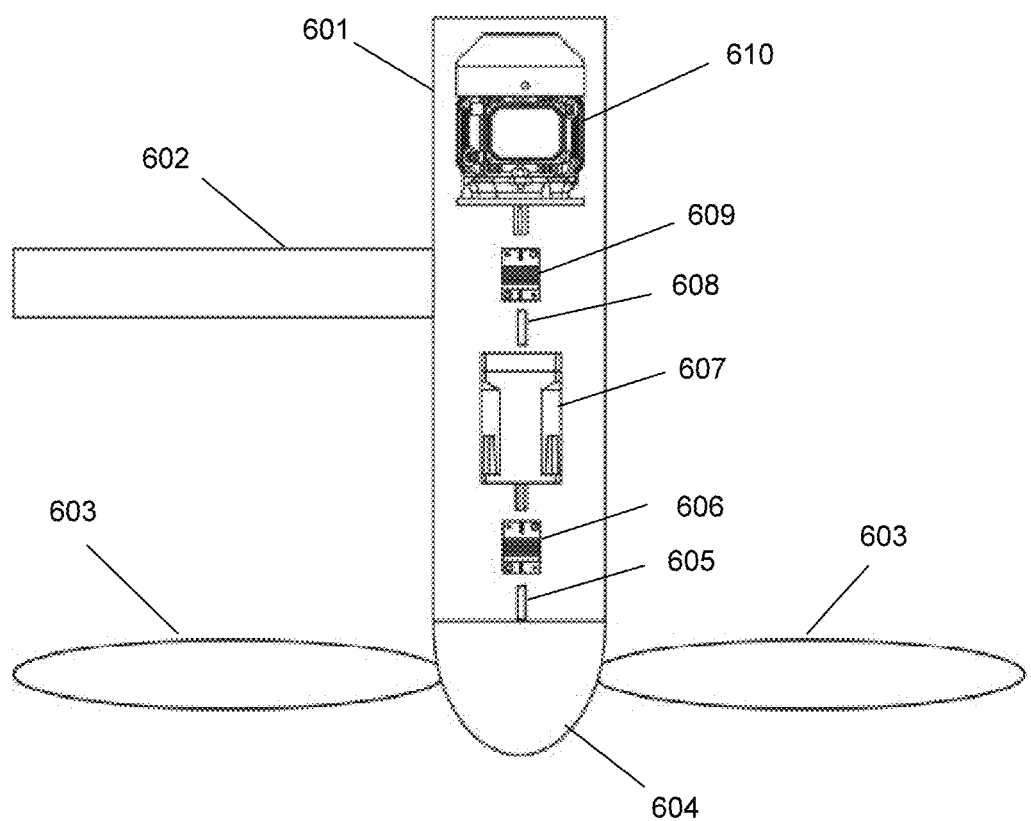
FIG. 6 is a block diagram illustrating in more detail the components in a bidirectional air turbine according to an example embodiment.

FIG. 6 is a block diagram illustrating in more detail the components in a bidirectional air turbine 107 according to an example embodiment. The bidirectional air turbine 107 includes an outer nacelle 601. Coupled to a bottom end of the nacelle 601 is a hub 604. The hub 604 is coupled to a set of rotor blades 603, configured to rotate in the same direction regardless of the direction of air flow. The hub 604 and rotor blades 603 are coupled to a gearbox 607 via a first shaft 605 and a first shaft coupler 606. The gearbox 607 is coupled to a generator 610 via a second shaft 608 and a second shaft coupler 609. The rotation of the rotor blades 603 rotates gears in the gearbox 607, which in turn causes the generator 610 to rotate and generate electricity. The bidirectional air turbine 107 is coupled to the top body 101 via a support structure 602, such that the bidirectional air turbine 107 is positioned in the path of the air flow through the air channel 109.

Referring to FIGS. 1 through 5B, when deployed in the ocean, a portion of the top body 101, called a "draft" 112, is submerged in the water, with a water column residing within a portion of the chamber 105. The remaining portion of the chamber 105 contains air compressed by the water column. The buoyancy volume 110 provides buoyancy to the top body 101. A skirt 111 accelerates the water column and provides ballast weight. When deployed, the bottom body 102 is fully submerged in the water beneath the top body 101.

Figure 7:
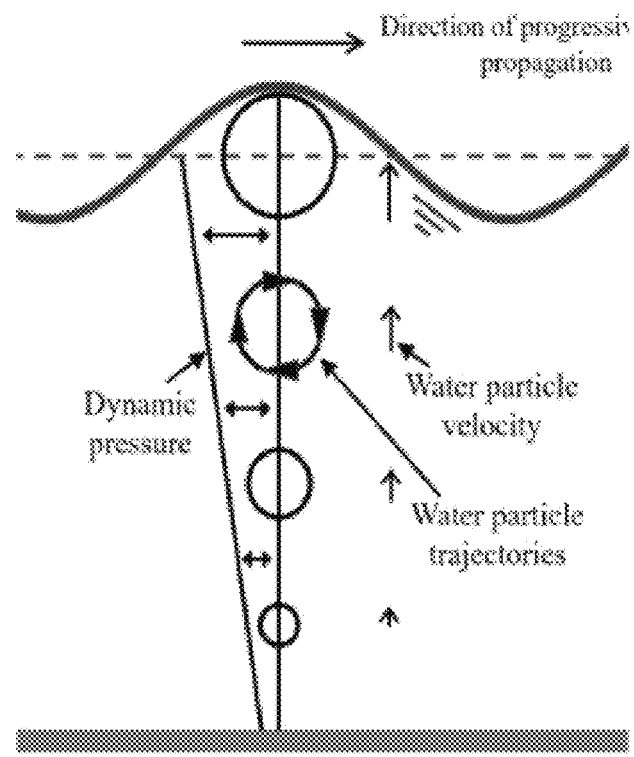
FIG. 7 is a diagram illustrating the relationship between water depth and water particle velocity.

The OWC 100 takes advantage of the different wave-induced water velocities between the ocean surface and water beneath the surface. FIG. 7 is a diagram illustrating the relationship between water depth and water particle velocity. When a wave's energy passes through the water, it causes water particles to move in an orbital motion. For example, with progressive propagation of an ocean wave being from left to right, the water particles move in a clockwise direction. The diameter of the orbit and the wave's energy decreases as the water gets deeper, since the dynamic pressure in the wave decreases with depth. Returning to FIGS. 1 through 5B, when the water surface rises due to an incident wave, the water surface within the chamber 105 of the top body 101 rises with a certain speed, while the top body 101 moves up at a slower speed than the water surface. The slower upward motion of the top body 101 is due to the bottom heave plate 201 resisting the motion of the top body 101, due to the bottom body 102, 300, 400, or 500 being surrounded by water below the surface with decreased motion. The depth of the bottom body 102, 300, 400, or 500 below the water surface also lowers the center of gravity of the OWC 100 and increases its stability. For example, the top body 101 may have approximately a 6 m outer diameter, a 6 m draft, and 10 m height from the top end 103 to the bottom end 104. The bottom body 102, 300, 400, or 500 may be approximately 25 m below the water surface.

When the water surface rises, resulting in wave-induced air pressurization in the chamber 105, air is pressured into the air channel 109, rotating the bidirectional air turbine 107 and causing the generator 610 to convert the rotations into electricity. As the top body 101 moves upward, the flexible tethers 108 pull on the bottom body 102, 300, 400, or 500, causing the bottom body 102, 300, 400, or 500 to also move upward. The upward motion of the bottom body 102, 300, 400, or 500 causes the geometry of the bottom heave plate 201 to passively change due to the valves moving to the closed positions (see FIGS. 2B, 3B, 4B, and 5B), closing the openings 202 to prevent water from flowing through. The closing of the openings 202 results in the bottom body 102, 300, 400, or 500 adding mass to the OWC 100 when the top body 101 moves upward. The amount of mass added is related to the diameter of the bottom heave plate 201, where the larger the diameter of the bottom heave plate 201, the greater the added mass. The top body 101 may reach resonance at typical wave conditions without requiring additional physical mass, leading to higher capture width ratio (CWR) and power-to-mass ratio.

Once an incident wave has passed and the water surface falls, the geometry of the bottom heave plate 201 passively changes due to the valves moving to the open position, allowing water to flow through the openings 202. This allows the bottom body 102, 300, 400, or 500 to move down as quickly as the top body 101 and to keep the flexible tethers 108 between the top 101 body and the body 102, 300, 400, or 500 taut. Due to the water flowing through the openings 202, less water resistance is experienced with the downward movement of the bottom body 102, 300, 400, or 500 than with the upward movement. As a result, air is drawn into the chamber 105, rotating the bidirectional air turbine 107 and causing the generator 610 to convert the rotations to electricity. The OWC 100 is then ready for the next wave. The depth to which the bottom body 102 moves down is set by the length of the flexible tethers 108.

Figure 9:
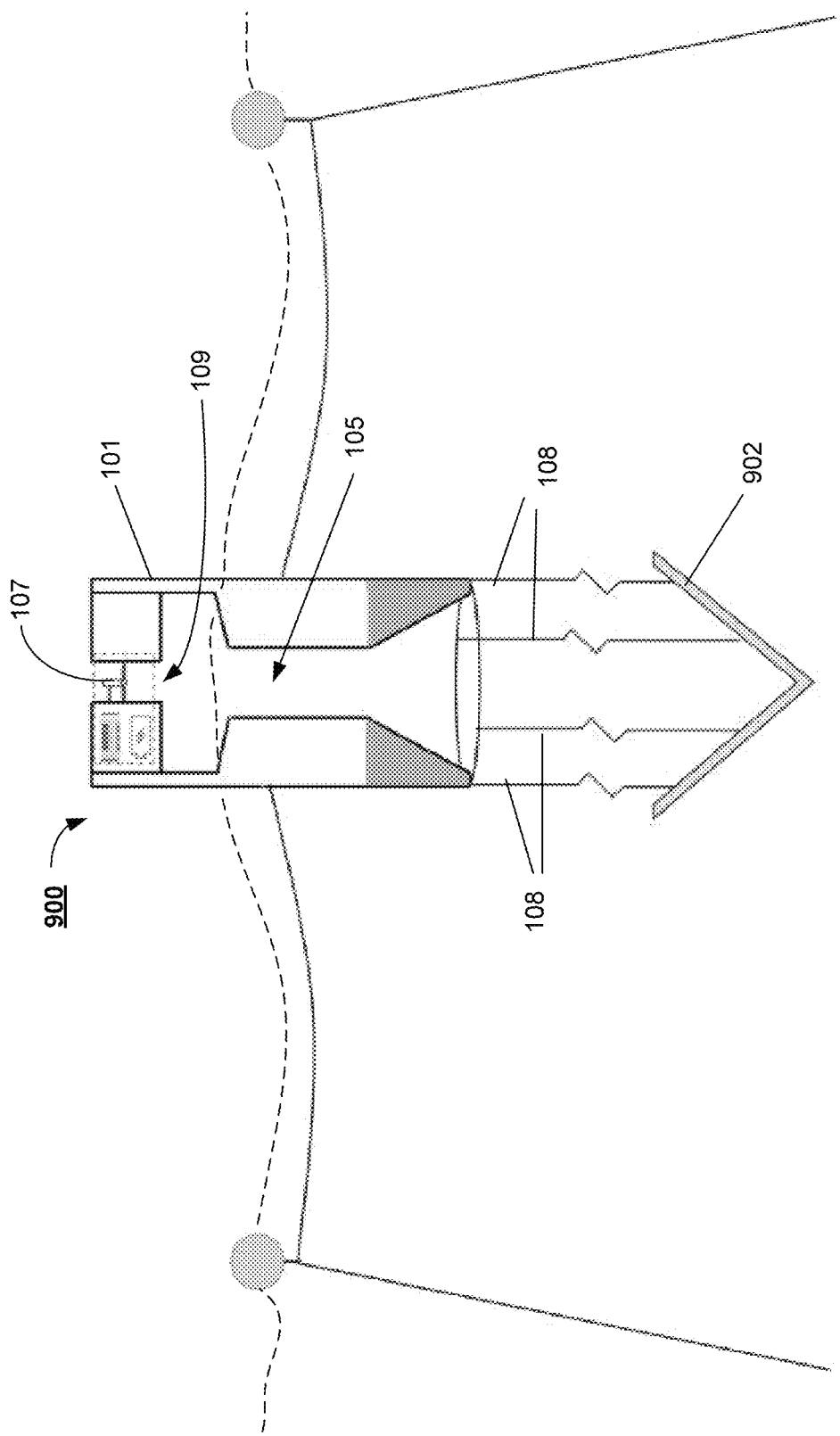
FIG. 9 illustrates a cross-sectional view of an OWC with a bottom body having a geometry with an asymmetric effect.

FIG. 9 illustrates a cross-sectional view of an OWC 900 with a bottom body 902 having a geometry with an asymmetric effect. The OWC 900 includes the top body 101 similar to the OWC 100. The bottom body 902 comprises a geometry with an asymmetric effect, where the water resistance experienced during an upward motion of the bottom body 902 is larger than during a downward motion of the bottom body 902. An example of a geometry with an asymmetric effect is a hollow cone shape with the base side facing upward and the apex side facing downward. When the water surface rises, the top body 101 moves upward. As the top body 101 moves upward, the flexible tethers 108 pull on the bottom body 902, causing the bottom body 902 to also move upward. The base side of the hollow cone shape facing upward results in water resistance during the upward motion of the bottom body 902. The water resistance causes the bottom body 902 and top body 101 to rise at a slower speed than the water surface within the chamber 105, resulting in wave-induced air pressurization in the chamber 105. The air pressurization in the chamber 105 causes air to be pushed into the air channel 109, rotating the bidirectional air turbine 107, and causing the generator 610 to convert the rotations into electricity. When the water surface falls, the apex side of the hollow cone shaped bottom body 902 allows the bottom body 902 to move downward as quickly as the top body 101 and to keep the flexible tethers 108 between the top 101 body and the body 902 taut. With the apex side of the hollow cone shape facing downward, water resistance experienced during the downward movement of the bottom body 902 is less than the water resistance experienced during the upward movement of the bottom body 902. The amount of resistance added is related to the size of the hollow cone, where the larger the hollow cone, the greater the added resistance during the upward movement of the bottom body 902. The OWC 900 is then ready for the next wave. The depth to which the bottom body 902 moves downward is set by the length of the flexible tethers 108. Other shapes for the bottom body 902 with asymmetric effect may also be used.

The OWCs 100 and 900 provide several advantages over existing OWCs. For example, the draft of the OWCs 100 and 900 may be shallower than some existing OWCs. With a shallower draft, the wave-induced pressure at the bottom of the top body 101 is higher than with a deeper draft, leading to higher power input.

The use of flexible tethers 108 to couple the top body 101 and the bottom body 102, 300, 400, 500, or 902 provides advantages over some existing OWCs that do not use flexible tethers. For example, an existing OWC may have a single hollow body connected to a surface floater and open at the bottom end to seawater. Under ocean waves, the motion of the water mass in the tube compresses the air which is confined in the upper side of the tube above the water level, generating a reciprocating air flow through a turbine. The tube bottom opening of the single-body OWC may be located deeper in the water than the draft of the top body 101 of the OWC 100 and 900 (e.g., 36 m vs 6 m) where the wave-induced dynamic water pressure at the deeper location is relatively small. In addition, through the use of tethers 108 to connect the top body 101 and the bottom body 102, 300, 400, 500, or 902, the OWCs 100 and 900 incur a lower construction cost compared to the single-body OWC.

Some existing wave energy converters (WECs) use a tether-driven PTO system, a direct drive PTO, or hydraulic PTO to generate electricity. In comparison, the OWCs 100 and 900 use an air turbine-based PTO, which has higher reliability, easier maintenance, lower peak-to-average power ratios, and simpler power electronics which lowers costs.

Some existing WECs use a bottom heave plate that does not change geometry. Such a heave plate design provides some added mass but requires a larger amount of physical mass than the OWC 100 to keep the connecting tethers taut in its downward motion. In contrast, the OWC 100 uses a bottom heave plate 201 that changes its geometry under waves, which results in water resistance during the downward movement of the bottom body 102, 300, 400, or 500 that is smaller than the water resistance during the upward movement of the bottom body 102, 300, 400, or 500. As a result, the bottom body 102, 300, 400, or 500 moves downward as quickly as the top body 101 which keeps the flexible tethers 108 between the top 101 body and the bottom body 102, 300, 400, or 500 taut. The bottom heave plate 201 provides a larger amount of added mass resisting the upward motion of the top body 101, which benefits power generation. By using the added mass of the bottom body 102, 300, 400, or 500 during the upward motion of the top body 101, the natural frequency of the OWC 100 can be tuned to match the typical wave conditions at the site using a smaller amount of physical mass than WECs without a heave plate that changes geometry. Therefore, the power capture and the power-to-mass ratio of the OWC 100 can be comparatively increased.

Some existing WECs use a bottom heave plate geometry that does not have an asymmetric effect. Such a heave plate design provides some added mass but requires a larger amount of physical mass than the OWC 900 to keep the connecting tethers taut in its downward motion. In contrast, the OWC 900 uses a bottom body 902 that has a geometry which results in water resistance that is smaller when the bottom body 902 moves downward than when the bottom body 902 moves upward. As a result, the bottom body 902 moves downward as quickly as the top body 101 which keeps the flexible tethers 108 between the top 101 body and the bottom body 902 taut. The bottom body 902 provides a larger amount of added mass resisting the upward motion of the top body 101 than the existing WECs, which benefits power generation. By using the added mass of the bottom body 902 during the upward motion of the top body 101, the natural frequency of the OWC 900 can be tuned to match the typical wave conditions at the site using a smaller amount of physical mass than WECs without a heave plate that has a geometry with asymmetric effect. Therefore, the power capture and the power-to-mass ratio of the OWC 900 can be comparatively increased.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. An oscillating water column (OWC), comprising: a top body comprising a hollow shape, the top body further comprising: an open top end; an open bottom end; a chamber traversing between the open top end and the open bottom end; a power take-off system proximate to the open top end; and an air channel proximate to the open top end and the power take-off system; a bottom body comprising a bottom heave plate; and a plurality of flexible tethers coupling the top body and the bottom body.

P2. The OWC of P1, wherein the OWC is deployed in water, wherein the top body is partially submerged in the water and the bottom body is submerged in the water under the top body.

P3. The OWC of P2, wherein a rising of a water surface or a falling of the water surface causes air in the chamber to traverse through the air channel, wherein the air traversing through the air channel causes the power take-off system to generate electricity.

P4. The OWC of P1, wherein the bottom body further comprises: a plurality of openings in the bottom heave plate; a plurality of valves proximate to the plurality of openings, wherein the plurality of valves move to a closed position with an upward motion of the bottom body to close the plurality of openings, wherein the plurality of valves move to an open position with a downward motion of the bottom body to open the plurality of openings.

P5. The OWC of P4, wherein in response to a rising of a water surface, the top body moves upward, wherein the upward motion of the top body causes the plurality of flexible tethers to pull on the bottom body and to cause the bottom body to move in the upward motion, wherein the upward motion of the bottom body causes the plurality of valves to move to the closed position to close the plurality of openings.

P6. The OWC of P4, wherein in response to a falling of a water surface, the top body moves downward, wherein the downward motion of the top body causes the plurality of flexible tethers to stop pulling on the bottom body, wherein the bottom body moves in the downward motion, wherein the downward motion of the bottom body causes the plurality of valves to move to the open position to open the plurality of openings.

P7. The OWC of P4, wherein one or more of the plurality of valves is selected from a group consisting of a flap, a swing check valve, a lift check valve, and a ball check valve.

P8. The OWC of P4, wherein the plurality of valves comprises a plurality of flaps, wherein each pair of flaps of the plurality of flaps comprises asymmetric shapes.

P9. An oscillating water column (OWC), comprising: a top body comprising a hollow shape, the top body further comprising: an open top end; an open bottom end; a chamber traversing between the open top end and the open bottom end; a power take-off system proximate to the open top end; and an air channel proximate to the open top end and the power take-off system; a bottom body comprising: a bottom heave plate; a plurality of openings in the bottom heave plate; a plurality of valves proximate to the plurality of openings, wherein the plurality of valves move to a closed position with an upward motion of the bottom body to close the plurality of openings, wherein the plurality of valves move to an open position with a downward motion of the bottom body to open the plurality of openings; and a plurality of flexible tethers coupling the top body and the bottom body.

P10. An oscillating water column (OWC), comprising: a top body comprising a hollow shape, the top body further comprising: an open top end; an open bottom end; a chamber traversing between the open top end and the open bottom end; a power take-off system proximate to the open top end; and an air channel proximate to the open top end and the power take-off system; a bottom body comprising: a bottom heave plate comprising a geometry with asymmetric effect; and a plurality of flexible tethers coupling the top body and the bottom body.

P11. The OWC of P10, wherein the OWC is deployed in water, wherein the top body is partially submerged in the water and the bottom body is submerged in the water under the top body.

P12. The OWC of P11, wherein a rising of a water surface or a falling of the water surface causes air in the chamber to traverse through the air channel, wherein the air traversing through the air channel causes the power take-off system to generate electricity.

P13. The OWC of P11, wherein the geometry of the bottom body has the asymmetric effect, where water resistance experienced during an upward motion of the bottom body is larger than during a downward motion of the bottom body.

P14. The OWC of P13, wherein the bottom body comprises a hollow cone shape with a base side facing upward and an apex side facing downward.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An oscillating water column (OWC), comprising:
   a top body comprising a hollow cylindrical buoy column shape, the top body further comprising:
     an open top end;
     an open bottom end;
     a chamber traversing between the open top end and the open bottom end, the chamber comprising:
       a conical shaped skirt proximate to the open bottom end, the conical shaped skirt comprising a broader end and a narrower end, wherein the broader end of the conical shaped skirt resides proximate to the open bottom end and the narrower end of the conical shaped skirt resides distal to the open bottom end;
       a portion of the chamber proximate to the open top end; and
       a buoyancy volume residing between the conical shaped skirt and the portion of the chamber, wherein the buoyancy volume comprises a narrower water channel than the broader end of the conical shaped skirt and the portion of the chamber;
     a power take-off system proximate to the open top end; and
     an air channel proximate to the open top end and the power take-off system;
   a bottom body comprising a bottom heave plate; and
   a plurality of flexible tethers coupling the top body and the bottom body.

2. The OWC of claim 1, wherein the OWC is deployed in water, wherein the top body is partially submerged in the water and the bottom body is submerged in the water under the top body.

3. The OWC of claim 2, wherein a rising of a water surface or a falling of the water surface causes air in the chamber to traverse through the air channel, wherein the air traversing through the air channel causes the power take-off system to generate electricity.

4. The OWC of claim 1, wherein the bottom body further comprises:
   a plurality of openings in the bottom heave plate; and
   a plurality of valves proximate to the plurality of openings,
   wherein the plurality of valves moves to a closed position with an upward motion of the bottom body to close the plurality of openings, wherein the plurality of valves moves to an open position with a downward motion of the bottom body to open the plurality of openings.

5. The OWC of claim 4, wherein in response to a rising of a water surface, the top body moves upward, wherein the upward motion of the top body causes the plurality of flexible tethers to pull on the bottom body and to cause the bottom body to move in the upward motion, wherein the upward motion of the bottom body causes the plurality of valves to move to the closed position to close the plurality of openings.

6. The OWC of claim 4, wherein in response to a falling of a water surface, the top body moves downward, wherein the downward motion of the top body causes the plurality of flexible tethers to stop pulling on the bottom body, wherein the bottom body moves in the downward motion, wherein the downward motion of the bottom body causes the plurality of valves to move to the open position to open the plurality of openings.

7. The OWC of claim 4, wherein one or more of the plurality of valves is selected from a group consisting of a flap, a swing check valve, a lift check valve, and a ball check valve.

8. The OWC of claim 4, wherein the plurality of valves comprises a plurality of flaps, wherein each pair of flaps of the plurality of flaps comprises asymmetric shapes.

9. An oscillating water column (OWC), comprising:
   a top body comprising a hollow cylindrical buoy column shape, the top body further comprising:

an open top end;

an open bottom end;

a chamber traversing between the open top end and the open bottom end, the chamber comprising:

a conical shaped skirt proximate to the open bottom end, the conical shaped skirt comprising a broader end and a narrower end, wherein the broader end of the conical shaped skirt resides proximate to the open bottom end and the narrower end of the conical shaped skirt resides distal to the open bottom end;

a portion of the chamber proximate to the open top end; and a buoyancy volume residing between the conical shaped skirt and the portion of the chamber, wherein the buoyancy volume comprises a narrower water channel than the broader end of the conical shaped skirt and the portion of the chamber;

a power take-off system proximate to the open top end; and an air channel proximate to the open top end and the power take-off system;

a bottom body comprising:

a bottom heave plate;

a plurality of openings in the bottom heave plate;

a plurality of valves proximate to the plurality of openings, wherein the plurality of valves moves to a closed position with an upward motion of the bottom body to close the plurality of openings, wherein the plurality of valves moves to an open position with a downward motion of the bottom body to open the plurality of openings; and a plurality of flexible tethers coupling the top body and the bottom body.

10. An oscillating water column (OWC), comprising:

a top body comprising a hollow cylindrical buoy column shape, the top body further comprising:

an open top end;

an open bottom end;

a chamber traversing between the open top end and the open bottom end, the chamber comprising:

a conical shaped skirt proximate to the open bottom end, the conical shaped skirt comprising a broader end and a narrower end, wherein the broader end of the conical shaped skirt resides proximate to the open bottom end and the narrower end of the conical shaped skirt resides distal to the open bottom end;

a portion of the chamber proximate to the open top end; and a buoyancy volume residing between the conical shaped skirt and the portion of the chamber, wherein the buoyancy volume comprises a narrower water channel than the broader end of the conical shaped skirt and the portion of the chamber;

a power take-off system proximate to the open top end; and an air channel proximate to the open top end and the power take-off system;

a bottom body comprising:

a bottom heave plate comprising a geometry with asymmetric effect; and a plurality of flexible tethers coupling the top body and the bottom body.

11. The OWC of claim 10, wherein the OWC is deployed in water, wherein the top body is partially submerged in the water and the bottom body is submerged in the water under the top body.

12. The OWC of claim 11, wherein a rising of a water surface or a falling of the water surface causes air in the chamber to traverse through the air channel, wherein the air traversing through the air channel causes the power take-off system to generate electricity.

13. The OWC of claim 11, wherein the geometry of the bottom body has the asymmetric effect, wherein water resistance experienced during an upward motion of the bottom body is larger than during a downward motion of the bottom body.

14. The OWC of claim 13, wherein the bottom body comprises a hollow cone shape with a base side facing upward and an apex side facing downward.

\* \* \* \* \*